July 13, 1937.     H. W. FLETCHER     2,086,667
METHOD OF ENGAGING TOOL JOINT THREADS
Filed Feb. 18, 1935

*Harold W. Fletcher*
INVENTOR

BY *Jesse R. Stone*
ATTORNEY

Patented July 13, 1937

2,086,667

UNITED STATES PATENT OFFICE 2,086,667

METHOD OF ENGAGING TOOL JOINT THREADS

Harold W. Fletcher, Houston, Tex., assignor to Hughes Tool Company, Houston, Tex., a corporation of Texas Application February 18, 1935, Serial No. 7,108

6 Claims. (Cl. 29—148)

My invention relates to a method for engaging the threads of a tool joint in the operation of connecting together the box and pin of the joint.

Tool joints, which are used for connecting together the sections of a drill stem employed in well drilling, are ordinarily made of a special quality of steel and the threads are coarse threads intended to withstand heavy strains and repeated screwing together and unscrewing in use. It is found, however, that in tightening the threads of the joint so as to maintain a seal at the point of connection, the threads do not fit so closely but what leakage may occur and the difficulty of preventing leakage along the threads is one which causes a great deal of trouble in the field and concern to the driller.

One of the principal reasons why the threads do not properly interfit and form a tight seal is that in the ordinary machining which is done upon the threads of the box and pin members of the joint the surfaces of the threads cannot be made absolutely smooth and accurate. There are little imperfections in the surfaces of the threads which, when the threads interfit, allow spaces or small cavities between the faces of the threads which tend to allow leakage. The pin member may be screwed tightly into the box member with the imperfect faces of the threads contacting with each other and it will not be possible in the ordinary means employed in screwing the parts together to engage the threads so tightly that a seal may be accomplished.

It is an object of my invention to provide a method of tightening the threads as they are screwed together to such an extent that the imperfections of the surfaces of the threads are flattened out and engaged so that a seal may be made.

The invention lies in the method of screwing the parts together so that a seal may be accomplished.

In the drawing herewith, Fig. 1 is a side elevation, partly in section, illustrating an installation whereby the threads of the tool joint may be connected tightly together so that no leakage may occur.

Figure 1:
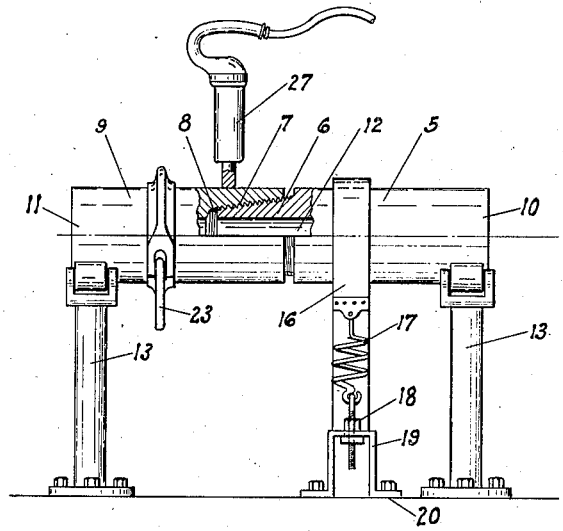

The two parts of the tool joint of ordinary construction are indicated in Fig. 1, the male or pin member 5 having a forward tapered pin 6 threaded with a coarse thread at 7 to engage within the box 8 of the box member 9 of the joint. It is to be understood that these are ordinary tool joints having at their ends 10 and 11, respectively, a threaded socket for connection with the sections of the drill stem, not shown. Each of the members of the joint has a longitudinal passage 12 therethrough for the passage of the flushing fluid.

Figure 2:
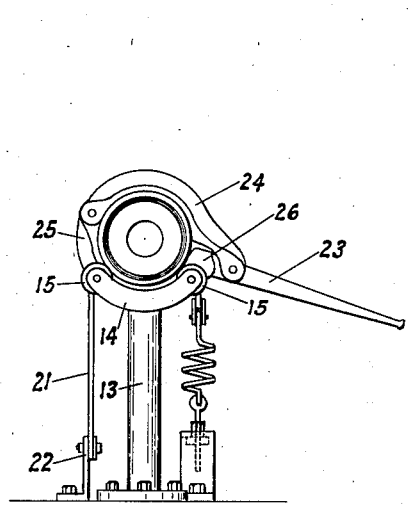
Fig. 2 is an end elevation of the installation shown in Fig. 1.

In Figs. 1 and 2 the joints are mounted for the screwing operation by means of which the joints are connected or disconnected. Each section of the joint is supported upon a post 13 having at its upper end an arcuate yoke 14 having rollers 15 at each end of said yoke. It will thus be seen that the two posts 13 with the yokes thereon furnish a support or cradle in which the members of the joint may be supported and rotated.

One of the sections, which may be the pin member 5, is arranged to be held against rotation by a brake band 16 extending around the section of the joint and resiliently held against the joint by a spring 17 connected at its lower end to an adjustable bolt or eyelet 18. Said bolt is adjustably mounted upon a U-shaped bracket 19 secured to the base 20 upon which the device is mounted. It will be seen that this brake band may be loosened by adjusting the bolt 18 within the bracket. The opposite end of the brake band is secured to a metal strap 21 extending downwardly and secured at its lower end to a bracket 22 upon the base. While a brake band has been shown to hold the pin member of the joint against rotation it is understood that any other suitable means may be employed.

When the box member is to be screwed upon the pin member, a pipe wrench of any desirable construction may be used. I have shown pipe tongs having a handle 23 and with pipe-engaging links or jaws 24, 25 and 26, respectively, secured about the pipe and arranged to hold the box member for movement with the handle 23.

This is a simple construction and will be easily understood. However, when the pin member is held against rotation and the box member is rotated by means of the pipe tongs 23, the parts may be screwed up until the joint is as tight as is ordinarily desired. This may be accomplished by setting the tension upon the brake band 16 to the desired amount by means of the tension on the spring 17 of the band. Thus when the parts have been screwed together as tightly as is ordinarily desired the pin member will begin to slip in the grip of the band and no further tightening can be accomplished.

I find that leakage will still occur when the joint has been thus secured together. To further engage the threads of the joint an air hammer or other similar pounding mechanism 27 is employed to deliver blows along the outer surface of the box member adjacent the threads. The hammer is shown as delivering blows radially of the joint, but I wish it understood that such blows may be delivered at the ends of the sections approximately axially of the said sections. I aim to drive the flat sides of the threads against one another and, to do so, the blows will be delivered in the direction which is most effective with the particular type and pitch of thread employed. While these blows are being delivered upon the threads the pipe tongs are employed to exert a torque upon the box member and further tightening of joints is easily obtained. The delivering of the blows upon the outer surface of the box drives the inequalities in the two threads together so that the passage of liquid between the surfaces of the threads is prevented.

Figure 3:
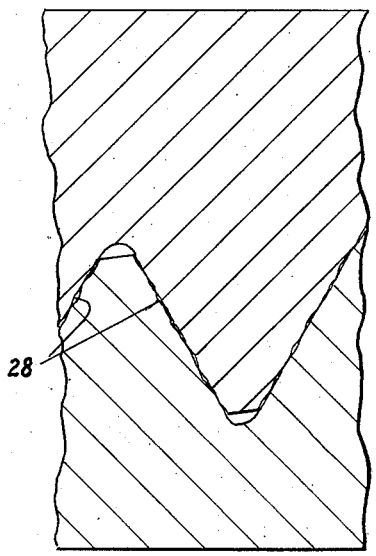
Fig. 3 is an enlarged sectional detail of the threaded portion of the joint indicating the manner in which the threads interengage when not properly tightened.
Figure 4:
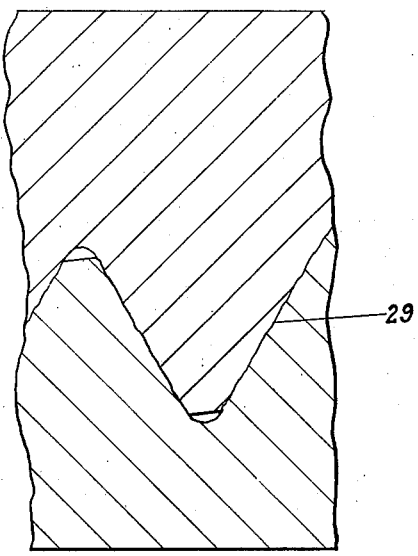
Fig. 4 is a similar view showing the manner in which the threads may be tightened so that leakage is prevented.

Thus in Figs. 3 and 4 it will be noted that when the joint has been tightened up in the usual manner there may be inequalities in the surface of the threads such as are indicated at 28 in Fig. 3. These inequalities may allow a certain limited flow or leakage of fluid therethrough which will eventually wear a passage so that a marked leakage and wear of the threads will occur. By pounding the outer surface of the box and exerting torque simultaneously upon the box the inequalities in the surfaces of the threads may be ironed out and interengaged to the extent shown at 29 in Fig. 4. Thus the parts of the joint will be held more securely together and, still more important, the danger of leakage along the threads is effectively prevented.

I have found that although the parts may be screwed together until the pin member 5 begins to rotate within the brake band; if then blows are delivered upon the outer surface of the box member adjacent the threaded area the joint may be tightened still further and that when thus tightened the threads are so effectively engaged that leakage is prevented.

It will be seen that the essence of my invention consists in flattening out and more effectively interfitting the threads of a joint while torque is being delivered upon the parts of the joint so as to cause them to advance slightly in their screwing action and causing the surfaces to interfit to such an extent that no leakage may occur. While I have shown one apparatus which may be employed in performing this operation it is obvious that this is not the only apparatus which might be employed for accomplishing my invention.

What I claim as new is:

1. The process of engaging the threads in tool joints and the like having a male section and a female section, comprising supporting said sections in position for screwing, restraining the rotation of one section by a predetermined force, exerting a screwing torque upon the other section until the predetermined force has been exceeded, and then delivering blows upon the outer surface of the female member to flatten out imperfections in the said threads and allow said threads to closely interfit to prevent leakage and meanwhile continuing the screwing torque on said section.

2. The process of engaging the threads in tool joints and the like having a male section and a female section, comprising supporting said sections in position for screwing, restraining the rotation of one section by a predetermined force, exerting a screwing torque upon the other section and simultaneously delivering blows upon the outer surface of said female member to flatten out irregularities upon both male and female threads, and allow said threads to tightly interengage to form a fluid seal.

3. A process of interfitting the threads upon the male and female members of a tool joint; comprising restraining the rotation of one of said members with a predetermined force, rotating the other member to screw said threads together, delivering blows upon the outer surface of the female member of said joint to overcome imperfections on the surfaces of said threads and allow a sealing engagement, and continuing said rotation until said predetermined force has been exceeded and both members are rotated.

4. A process of interfitting the threads upon the male and female members of a tool joint; comprising frictionally engaging the male member to resist rotation thereof by a predetermined force, delivering blows approximately radially of said female member to cause the flattening out of inequalities in the surfaces of said threads and simultaneously exerting a screwing torque upon said female member until said male member is also rotated and a fluid seal is accomplished.

5. A process of interfitting the threads upon the male and female members of a tool joint; comprising screwing the members together tightly, then exerting a screwing torque upon said sections and simultaneously delivering blows upon one of said sections to force the contacting faces of the threads closely together and smooth out imperfections in said threads, so that close interfitting engagement of said threads is accomplished.

6. A process of interfitting the threads upon the male and female members of a tool joint; comprising screwing the members together tightly, then exerting a screwing torque upon said sections and simultaneously delivering blows in an axial direction upon one of said sections to force the contacting faces of the threads closely together and smooth out imperfections in said threads, so that close interfitting engagement of said threads is accomplished.

HAROLD W. FLETCHER.